United States Patent [19]
Lawless et al.

[11] Patent Number: 5,374,477
[45] Date of Patent: Dec. 20, 1994

[54] BARRIER LAMINATE AND METHOD FOR SEALING GAPS IN BUILDING CONSTRUCTION

[75] Inventors: Joseph D. Lawless, Bloomington, Minn.; Robert H. Heil, New Richmond, Wis.; Scott R. Pribnow, Woodbury; Duncan R. Russell, North Oaks, both of Minn.

[73] Assignee: Minnesota Mining and Manufacturing Company, St. Paul, Minn.

[21] Appl. No.: 15,560

[22] Filed: Feb. 9, 1993

[51] Int. Cl.⁵ ............................................. C09J 7/02
[52] U.S. Cl. ............................ 428/317.3; 156/71; 428/317.5; 428/343; 428/351
[58] Field of Search ............ 428/40, 317.3, 317.5, 428/343, 354, 351; 156/71

[56] References Cited

U.S. PATENT DOCUMENTS

| | | |
|---|---|---|
| 2,294,347 | 8/1942 | Bauer et al. |
| 2,387,593 | 10/1945 | Lesser |
| 3,032,181 | 5/1962 | Hutter et al. |
| 3,121,021 | 2/1964 | Copeland |
| 3,364,063 | 1/1968 | Satas |
| 3,618,754 | 11/1971 | Hoey |
| 3,729,879 | 5/1973 | Franklin ............................ 428/40 |
| 4,112,177 | 9/1978 | Salditt et al. |
| 4,302,500 | 11/1981 | Flora |
| 4,632,860 | 12/1986 | D'Antonio et al. |
| 4,709,523 | 12/1987 | Broderick ........................ 428/354 |
| 4,929,303 | 5/1990 | Sheth |

OTHER PUBLICATIONS

Two page article: "Is Housewrap A Good Investment?" by J. D. Ned Nisson Journal of Light Construction, Oct. 1991.
Four page article: "Woven Housewraps Boost Energy Efficiency" by William Runyon from Contractors Guide, Jan. 1992.
One page article: "Building Wraps Guard Against The Elements" from Walls & Ceilings, Jul. 1992.
Three page article: "Tighten Up With Air Sealing" by Bruce Sullivan Journal of Light Construction, Jan. 1993.
Four page article: "Wrap Wars" by Alex Wilson, New England Builder, Aug. 1987.
Four page article: "The Housewrap Wars" Energy Design Update, Apr. 1987.

*Primary Examiner*—Jenna L. Davis
*Attorney, Agent, or Firm*—Faegre & Benson

[57] ABSTRACT

A barrier laminate for attachment to the outer surface of a structure, such as a house prior to attachment of its siding, to cover joints between structural members assembled to form the structure. The barrier laminate comprises a flexible elongate barrier layer having minute passageways between its major surfaces affording passage of water vapor while restricting the passage of liquid water and air between its major surfaces. Means providing an exposed layer of pressure sensitive adhesive along each of the opposite edges of the barrier layer are provided for adhering the barrier layer to structural members on opposite sides of a joint therebetween.

8 Claims, 8 Drawing Sheets

BARRIER LAMINATE AND METHOD FOR SEALING GAPS IN BUILDING CONSTRUCTION

TECHNICAL FIELD

The present invention relates to barriers for attachment to the outer surface of a structure (e.g., over the sheathing on a house prior to attachment of its siding) over joints and gaps between sheathing members and between structural members assembled to form the structure to restrict the passage of liquid water and air (e.g., rain and wind) through the barrier to the inside, while affording passage of water vapor from the inside out to atmosphere.

Background Art

Housewraps are known for attachment to the outer surfaces of structures (e.g., over the sheathing on a house prior to attachment of its siding) over joints between structural members assembled to form the structures, which housewraps restrict the passage of liquid water and air (e.g., rain and wind) through the housewraps into the structures, while affording passage of water vapor through the housewraps. Such restriction of liquid water keeps water (e.g., rain) from entering the structures and damaging their insulation and structural members, while such restriction of the air prevents air currents from entering the interior of the structures and minimizes air movement within the walls of the structures so that the maximum effective heat retention or "R" values of the walls can be obtained. Such passage of water vapor through the housewraps allows water vapor which enters the walls from the interior of the structures to exit so that such water vapor can be restricted from condensing within the walls and potentially damaging their insulation and structural members. Heretofore, however, such housewraps have been in the form of sheet materials attached over the entire outer surfaces of the exterior sheathing on structures such as houses prior to attaching siding to the structures. Typical sheet materials for housewraps of this type include (1) the sheet material made of spunbonded high density polyethylene fibers sold under the trade designation "DuPont Tyvek (TM) Housewrap" by DuPont Company, Wilmington, Del.; (2) the sheet material made of spunbonded polypropylene fibers sold under the trade designation "Typar (TM) Housewrap", Reemeay Inc., Old Hickory, Tenn.; (3) the high density, cross laminated microperforated polyethylene sheet material sold under the trade designation "Rufco-wrap" by Raven Industries, Inc, Sioux Falls, S.D., and (4) the cross-woven microperforated polyolefin sheet materials sold by Amoco Foam Products Company, Atlanta, Ga., and Fabrene Inc., Mississauga, Ontario, under the trade designations "Arnowrap (TM) Housewrap" and "Air-Gard Housewrap", respectively. While such housewrap sheet materials are effective if properly attached to structures, such attachment is not convenient and ordinarily cannot be applied at the same time as the sheathing or siding. Such housewrap sheet materials are often installed as a separate step after the sheathing has been fully installed on a structure and before the siding is attached. Many times at least two workers are required to attach housewrap sheet material to a structure because of the large size of the housewrap sheet material. Two story structures require scaffolding to properly attach the sheet material and sometimes this is not done. Instead the sheet material is installed on the inside or outside of the second story wall section before it is stood up and hence the sheet material installed in this manner will not cover joints or gaps in the construction. Such attachment is time consuming because the housewrap sheet material is often attached to the structure by staples or other fasteners and the seams between adjacent pieces of housewrap sheet material on a structure are preferably sealed with pressure sensitive adhesive coated tape in order to effectively reduce air and water leakage at gaps and joints in the sheathing and housewrap sheet material (e.g, such as that tape sold under the trade name "Y-8086 Contractors Sheathing Tape" by Minnesota Mining and Manufacturing Company, St. Paul, Minn. 55144-1000). Also, attachment of housewrap sheet material can be made difficult, complicated and possibly even dangerous by wind blowing the sheet material around. Improper attachment greatly affects performance, and extended exposure to sunlight (ultraviolet rays) can reduce performance of such housewrap sheet materials.

While it has also been known to have breathable surgical adhesive tapes which are vapor permeable (e.g. U.S. Pat. Nos. 3,121,021 and 4,112,177), such tapes have not had appropriate backing material suitable for sealing gaps in building construction and furthermore, such tapes have been coated edge-to-edge with adhesive, thus requiring a special adhesive that ultimately becomes porous to maintain vapor permeability. By being completely coated with adhesive, such tapes may attract contaminants such as dust and dirt or other particles of loose material present in a building construction environment and thus such fully coated tapes may become obstructed or clogged with foreign material, thus reducing or eliminating vapor permeability in the gap between building elements where such vapor permeability is desired.

Disclosure of Invention

The present invention provides a barrier for attachment to the outer surfaces of structures (e.g., over the sheathing on a house prior to attachment of its siding) over joints or gaps between structural members assembled to form the structures, which barrier will then, like the known barriers described above, restrict the passage of liquid water and air through the barriers into the structures, while affording passage of water vapor out through the barrier; but which barrier is significantly more convenient to attach in that it can be attached by one man, and its attachment is not significantly complicated by wind and can be conveniently done either at the same time the sheathing is applied or at the same time that the siding is attached over it. In addition, the adhesive used in the present invention is formulated to have good adhesion at low temperatures, enabling application of the barrier laminate over a wide range of climatic conditions.

According to the present invention there is provided a barrier laminate for attachment to the outer surface of a structure, such as over the sheathing on a house prior to attachment of its siding, to cover joints between structural members assembled to form the structure. The barrier laminate comprises (1) a flexible elongate barrier layer having minute passageways between its major surfaces affording passage of water vapor while restricting the passage of liquid water and air; and (2) means providing a layer of pressure sensitive adhesive along each of the opposite edges of the barrier layer for adhering the barrier layer to structural members on opposite sides of a joint therebetween. In the practice of the present invention, it is desirable that at least a portion of the barrier laminate between the adhesively coated edges be free of adhesive to assure vapor permeability in the barrier laminate. This will reduce a tendency of the barrier laminate to attract dust and other contaminants which may plug the minute passageways between the major surfaces, reducing or even substantially eliminating the vapor permeability of the barrier laminate.

The means providing the layer of pressure sensitive adhesive along each of the opposite edges of the barrier layer can be provided in several ways including (1) by factory coating separate layers of pressure sensitive adhesive on elongate outer portions of its first major surface adjacent each of its opposite edges with the barrier layer having a central portion at least partially free of adhesive between its outer adhesive coated portions (i.e., the central portion may be entirely free of adhesive, or the barrier layer may be coated with spaced narrow longitudinally extending layers or stripes of pressure sensitive adhesive, two of which stripes are on the elongate outer portions of its first major surface adjacent each of its opposite edges, and other of which stripes (one or more) are positioned in spaced relationship between those outer portions); (2) by a layer of pressure sensitive adhesive coated entirely over its first major surface, which layer of adhesive has through openings aligned with the minute passageways between the major surfaces of the barrier layer to afford passage of water vapor through the barrier laminate; (3) by two lengths of tape each including a backing and a layer of pressure sensitive adhesive coated on one major surface of the backing, which lengths of tape have portions of their layers of pressure sensitive adhesive adhered on the first surface of the barrier layer adjacent its opposite edges and have portions of their layers of pressure sensitive adhesive projecting past the opposite edges of the barrier layer to provide the exposed layers of pressure sensitive adhesive; or (3) by applying to the elongate outer portions of the first major surface of the barrier strip adjacent each of its opposite edges lengths of a transfer adhesive, or lengths of a double coated tape, or lengths of a tape laminate made by a device such as that described in U.S. Pat. No. 4,981,537 (the content of which is incorporated herein by reference), which tape laminate has adhesive surfaces exposed along both major sides.

A method for providing a barrier using the new barrier laminate can include applying the exposed layers of pressure sensitive adhesive along the opposite edges of the barrier layer and adhering the exposed layers of pressure sensitive adhesive on the outer surface of structural members on opposite sides of a joint therebetween with the barrier layer extending longitudinally along and bridging widthwise across the joint. This method can involve either applying the exposed layers of pressure sensitive adhesive on the barrier layer in a location remote from the structural men, hers, such as at a factory, rolling the barrier laminate after the layers of pressure sensitive adhesive are applied, unrolling the barrier laminate from the roll at the structure, and manually adhering it to the structure. When the means in the barrier laminate that provides the exposed layer of pressure sensitive adhesive along each of the opposite edges of the barrier layer is provided by two lengths of attachment tape, this method can involve the use of a portable laminating device which adheres the lengths of tape along the opposite edges of the barrier layer, which portable laminating device can be used to form the barrier laminate at the site of the structure to which the barrier laminate is applied. Also, when the means in the barrier laminate that provides the exposed layer of pressure sensitive adhesive along each of the opposite edges of the barrier layer is provided by two lengths of transfer adhesive, or by two lengths of double coated tape, or by a tape laminate of the type described above, this method can include either (1) first applying the lengths of transfer adhesive, or the lengths of double coated tape, or the lengths of tape laminate to the barrier layer using the appropriate application device, and then applying the barrier layer carrying the pressure sensitive adhesive to the structure, or (2) first applying the lengths of transfer adhesive, or the lengths of double coated tape, or the lengths of tape laminate in spaced relationship to the structure using the appropriate application device, and then applying the barrier layer to the pressure sensitive adhesive attached to the structure.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
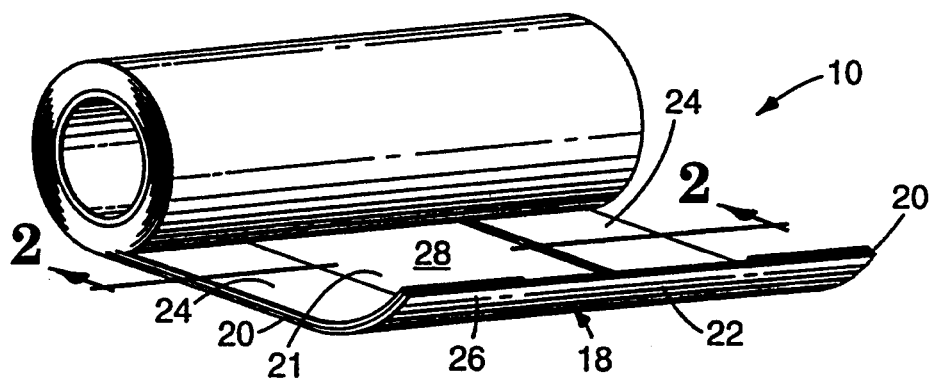
FIG. 1 is a perspective view of a first embodiment of a barrier laminate according to the present invention, illustrating a major portion of the barrier laminate disposed in a roll.
Figure 2:
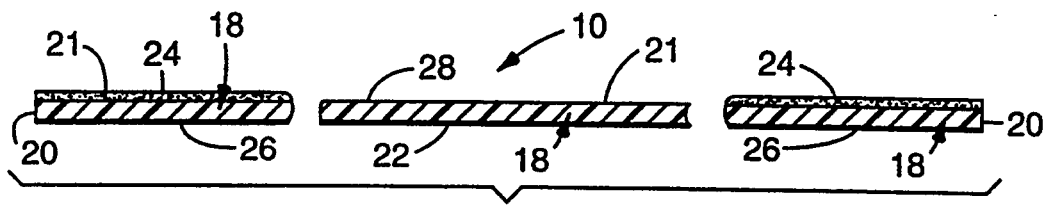
FIG. 2 is an enlarged sectional view taken approximately along line 2—2 of FIG. 1.

Referring now to the drawing, there is shown in FIGS. 1 and 2 a first embodiment of a barrier laminate according to the present invention generally designated by the reference numeral 10. The barrier laminate 10 is adapted for attachment to the outer surface of a structure, such as a house 12 illustrated in FIG. 11 after the sheathing 11 for the house 12 is attached and prior to attachment of siding to the house 12, to cover joints 13 between structural members and between adjacent sheathing members 11, window frame 15, door frame 16, sill 17, corners, cantilevers, raised heel trusses and band joists, etc. assembled to form the structure or house 12.

As is seen in FIGS. 1 and 2, the barrier laminate 10 comprises a flexible elongate barrier layer 18 having opposite edges 20 and opposite first and second major surfaces 21 and 22. The barrier layer 18 is porous material (e.g., any one of the commercially available porous barrier sheet materials described above) so that the barrier layer 18 has minute passageways between its major surfaces 21 and 22 affording passage of water vapor between its major surfaces while restricting the passage of liquid water and air between its major surfaces 21 and 22. The barrier laminate 10 also includes means providing a layer 24 of pressure sensitive adhesive along each of the opposite edges 20 of the barrier layer 18 for adhering the barrier layer 18 to structural members on opposite sides of a joint 13. In the barrier laminate 10, that means is provided by separate layers 24 of pressure sensitive adhesive coated on elongate outer portions 26 of the first major surface 21 of the barrier layer 18 adjacent each of its opposite edges 20 with the barrier layer 18 having a central portion 28 between its outer portions 26, which central portion 28 is free of adhesive to preclude interference of the adhesive with movement of the water vapor through the barrier layer 18. Preferably the pressure sensitive adhesive used to provide the layers 24 is the same adhesive used on the tape sold under the trade name "8086 Contractors Sheathing Tape" by Minnesota Mining and Manufacturing Company, St. Paul, Minn. 55144-1000, which adhesive is a copolymer of isooctyl acrylate and acrylic acid as described in U.S. Pat. Nos. Re. 24,906 and 2,884,126, the content whereof is incorporated herein by reference. More particularly, the adhesive formulation is preferably a copolymer of 98% (by weight) isooctyl acrylate and 2% (by weight) acrylic acid. The coating weight range is about 2 to 14 grams per square foot and preferably 4 to 8 grams per square foot. The layers 24 of pressure sensitive adhesive can be stripe coated on the barrier layer 18 using conventional factory equipment. Using such an adhesive within the parameters specified will enable application of the barrier laminate over a wide temperature range, extending down to as much as 14° F. (−10° C.).

Alternatively, the layers 24 of pressure sensitive adhesive could be provided in the form of transfer adhesive or on double coated tape and adhered to the barrier layer by conventional application equipment for such transfer adhesives or double coated tapes.

Figure 3:
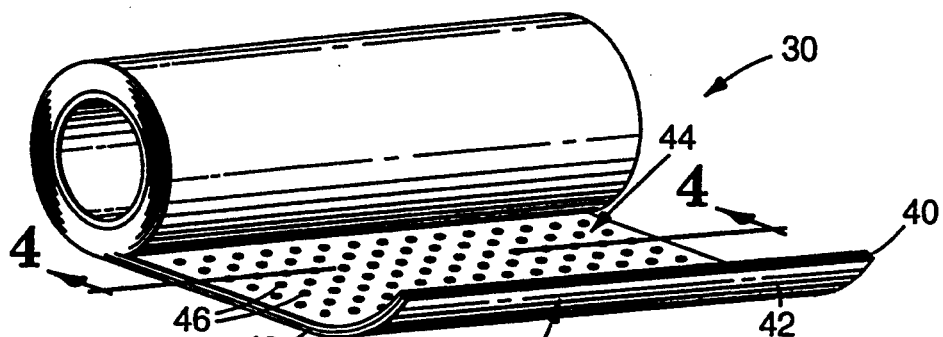
FIG. 3 is a perspective view of a second embodiment of a barrier laminate according to the present invention, illustrating a major portion of the barrier laminate disposed in a roll.
Figure 4:
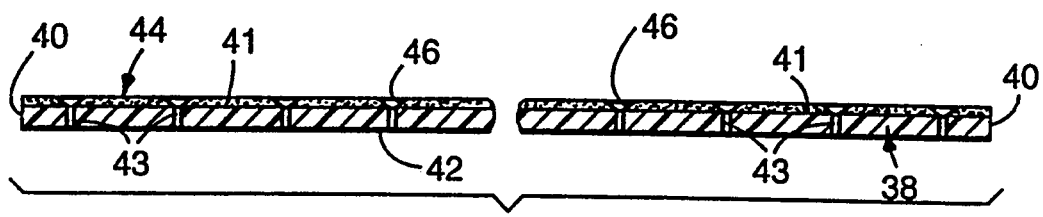
FIG. 4 is an enlarged fragmentary sectional view taken approximately along line 4—4 of FIG. 3.
Figure 7:
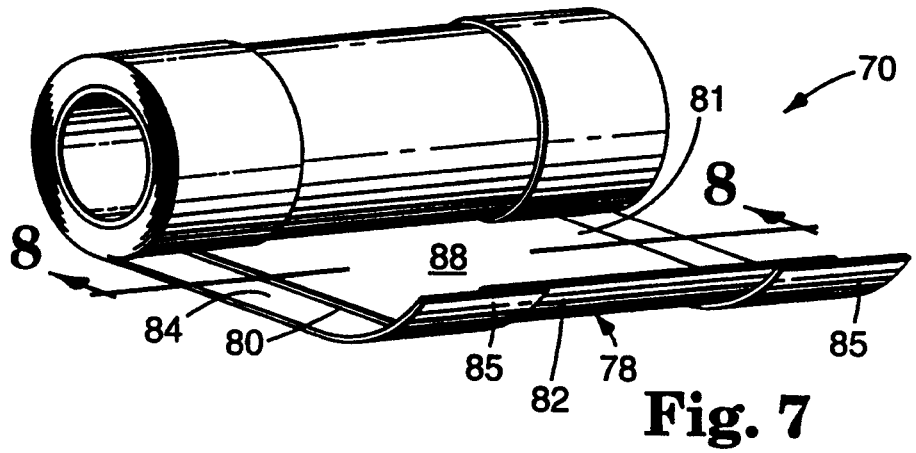
FIG. 7 is a perspective view of a forth embodiment of a barrier laminate according to the present invention, illustrating a major portion of the barrier laminate disposed in a roll.

Referring now FIGS. 3 and 4 of the drawing, there is shown a second embodiment of a barrier laminate according to the present invention generally designated by the reference numeral 30, which barrier laminate 30 is also adapted for attachment to the outer surface of a structure, such as the house 12 illustrated in FIG. 7 after its sheathing 11 is attached and prior to attachment of its siding, to cover joints 13 between structural members assembled to form the structure or house 12.

As is seen in FIGS. 3 and 4, the barrier laminate 30 comprises a flexible elongate barrier layer 38 having opposite edges 40 and opposite first and second major surfaces 41 and 42. The barrier layer 38 is porous material such as the microperforated high density polyethylene barrier sheet material sold under the trade designation "Rufco-wrap" by Raven Industries, Inc, Sioux Falls, S.D., so that the barrier layer 38 has minute passageways 43 between its major surfaces 41 and 42 affording passage of water vapor between its major surfaces while restricting the passage of liquid water and air between its major surfaces 41 and 42. The barrier laminate 30 also includes means providing an exposed layer 44 of pressure sensitive adhesive along each of the opposite edges 40 of the barrier layer 38 for adhering the barrier layer 38 to structural members on opposite sides of joint 13 therebetween. In the barrier laminate 30, that means is provided by a continuous layer 44 of pressure sensitive adhesive coated entirely over the first major surface 41 of the barrier layer 38, which layer 44 of adhesive has through openings 46 aligned with the minute passageways 43 between the major surfaces 41 and 42 of the barrier layer 38 to afford passage of water vapor through the barrier laminate 30. Such openings 46 in the layer 44 of adhesive have been found to form around the openings to the minute passageways 43 along the first major surface 41 when the material for the barrier layer described above is coated with pressure sensitive adhesive formed by the copolymerization of isooctyl acrylate and acrylic acid which is coated on the barrier layer 38 by a wire wound coating rod or by other conventional coating methods.

Figure 5:
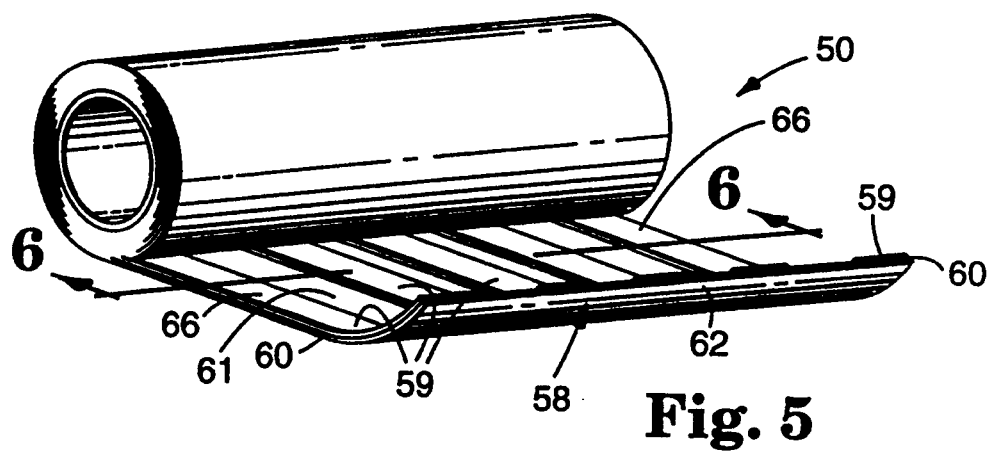
FIG. 5 is a perspective view of a third embodiment of a barrier laminate according to the present invention, illustrating a major portion of the barrier laminate disposed in a roll.
Figure 6:
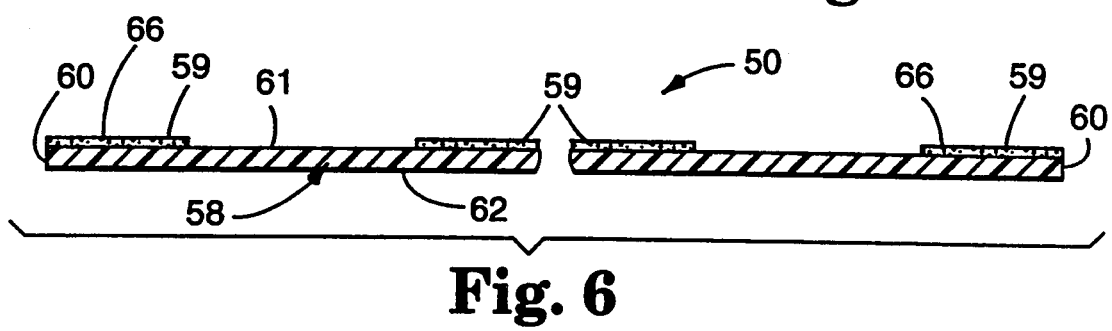
FIG. 6 is an enlarged fragmentary sectional view taken approximately along line 6—6 of FIG. 5.

Referring now to FIGS. 5 and 6 there is shown a third embodiment of a barrier laminate according to the present invention generally designated by the reference numeral 50. The barrier laminate 50 is adapted for attachment to the outer surface of a structure, such as a house 12 illustrated in FIG. 11 after the sheathing 11 for the house 12 is attached and prior to attachment of siding to the house 12, to cover joints 13 between structural members (e.g., sheathing 11, window frame 15, door frame 16, sill 17, etc.) assembled to form the structure or house 12.

As is seen in FIGS. 5 and 6, the barrier laminate 50 comprises a flexible elongate barrier layer 58 having opposite edges 60 and opposite first and second major surfaces 61 and 62. The barrier layer 58 is porous material (e.g., any one of the commercially available barrier sheet materials described above) 50 that the barrier layer 58 has minute passageways between its major surfaces 61 and 62 affording passage of water vapor between its major surfaces while restricting the passage of liquid water and air between its major surfaces 61 and 62. The barrier laminate 50 also includes means providing a layer of pressure sensitive adhesive along each of the opposite edges 60 of the barrier layer 58 for adhering the barrier layer 58 to structural members on opposite sides of a joint 13. The barrier layer 58 is coated with spaced longitudinally extending layers or stripes 59 of pressure sensitive adhesive, two of which stripes 59 are on elongate outer portions 66 of the first major surface 61 of the barrier layer 58 adjacent each of its opposite edges 60 and provide that means in the form of separate layers of pressure sensitive adhesive coated on elongate outer portions 66 of the first major surface 61 of the barrier layer 58 adjacent each of its opposite edges 60. The others of the stripes 59 (one or more, with three being illustrated) are positioned in spaced relationship between those outer portions 66. Such coating with pressure sensitive adhesive, which can be stripe coated on the barrier layer 58 using conventional factory equipment, provides the advantage that a large number of closely spaced stripes can be applied to a large sheet of the barrier layer material, and the barrier laminate may be slit in any desired width from that large sheet along lines parallel to the stripes without great concern for registry of the slitting knives with the edges of the strips of adhesive, as two of the strips will always be relatively close to the edges 60 of the barrier laminate, and the central portion of the barrier laminate will always have portions free of adhesive so as not to restrict passage of water vapor through the barrier layer 58. Preferably the pressure sensitive adhesive used to provide the layers is the same adhesive used on the tape sold under the trade name "8086 Contractors Sheathing Tape" by Minnesota Mining and Manufacturing Company, St. Paul, Minn. 55144-1000, which is a copolymer of isooctyl acrylate and acrylic acid as described in U.S. Patent No. U.S. Pat. Nos. Re. 24,906 and 2,884,126.

Figure 8:
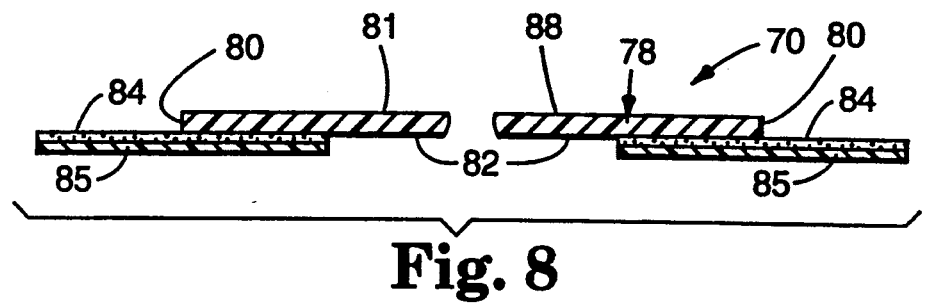
FIG. 8 is an enlarged sectional view taken approximately along line 8—8 of FIG. 7.
Figure 11:
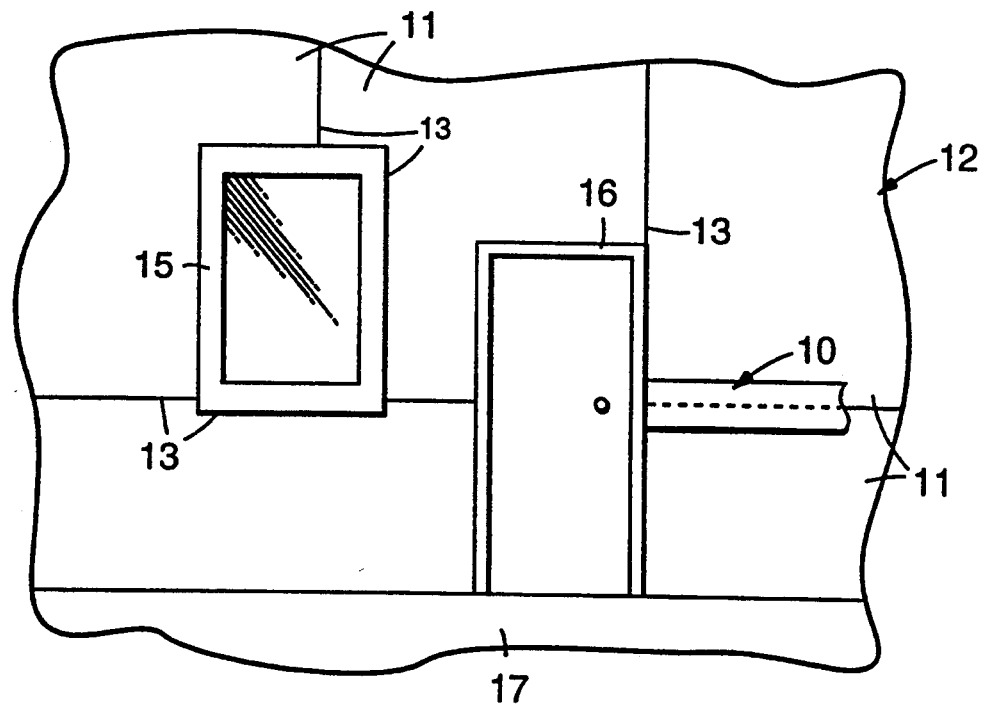
FIG. 11 is a fragmentary view of a structure having one of the barrier laminates illustrated in FIGS. 1 through 10 applied thereto.

Referring now to FIGS. 7 and 8 of the drawing, there is shown a fourth embodiment of a barrier laminate according to the present invention generally designated by the reference numeral 70, which barrier laminate 70 is adapted for attachment to the outer surface of a structure, such as a house 12 illustrated in FIG. 11 after the sheathing 11 for the house 12 is attached and prior to attachment of siding to the house 12, to cover joints 13 between structural members assembled to form the structure or house 12.

As is seen in FIGS. 7 and 8, the barrier laminate 70 comprises a flexible elongate barrier layer 78 having opposite edges 80 and opposite first and second major surfaces 81 and 82. The barrier layer 78 is porous material (e.g., any one of the commercially available barrier sheet materials described above) so that the barrier layer 78 has minute passageways between its major surfaces 81 and 82 affording passage of water vapor between its major surfaces while restricting the passage of liquid water and air between its major surfaces 81 and 82. The barrier laminate 70 also includes means providing an exposed layer 84 of pressure sensitive adhesive along each of the opposite edges 80 of the barrier layer 78 for adhering the barrier layer 78 to structural members on opposite sides of a joint 13 therebetween. In the barrier laminate 70, that means is provided by two lengths 85 of tape each including a backing and a layer of pressure sensitive adhesive coated on one major surface of the backing (e.g., such as the pressure sensitive adhesive coated tape used is the tape sold under the trade name "8086 Contractors Sheathing Tape" by Minnesota Mining and Manufacturing Company, St. Paul, Minn. 75144-1000). Portions of the layers of pressure sensitive adhesive on the lengths 85 of tape are adhered on the second surface 82 of the barrier layer 78 adjacent its opposite edges 80 with portions of the layers of pressure sensitive adhesive on the lengths 85 of tape projecting past the opposite edges 80 of the barrier layer 78 to provide the exposed layers 84 of pressure sensitive adhesive by which the barrier laminate 70 can be adhered to a substrate, with the barrier layer 78 having a central portion 88 between the lengths 85 of tape, which central portion is free of adhesive and tape to preclude interference by the adhesive or tape with movement of the water vapor through the barrier layer 78.

Figure 12:
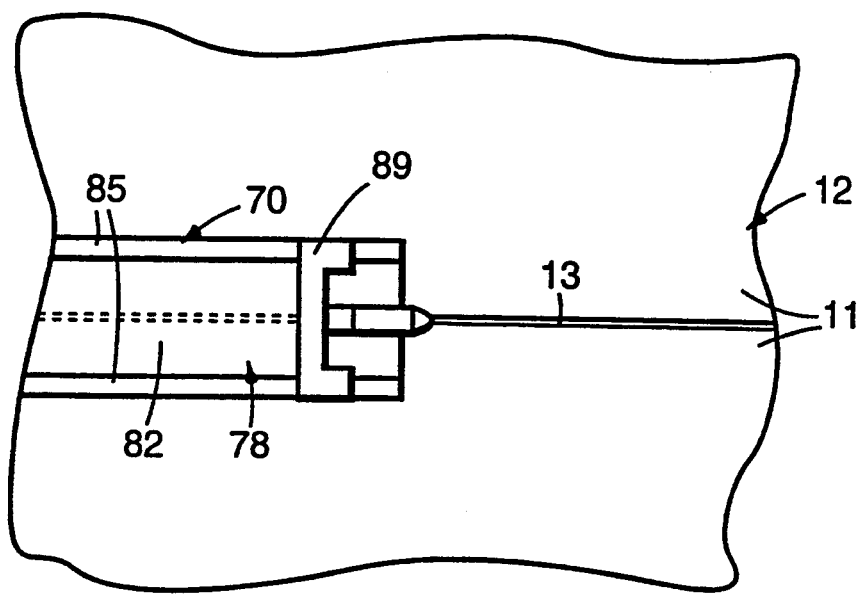
FIG. 12 is a fragmentary view of a structure having the barrier laminate of FIGS. 5 and 6 formed by a laminating device and applied thereto.

While the barrier laminate 70, like the barrier laminates 10 and 30, can be formed by factory equipment, rolled, shipped to the job cite, and applied from the roll as is illustrated in FIG. 11, the thickness of the laminate 70 where the lengths 85 of tapes and the barrier layer are adhered together causes thick portions of the roll which interfere with complete adhesion together of the portions of the lengths 85 of tape that project past the edges 80. Thus, preferably the barrier laminate 70 is formed at the site of the structure to which it is to be applied using a portable laminating device 89 such as that illustrated in FIG. 12, which laminating device 89 adheres the lengths 85 of tape to the barrier layer 78 to form the barrier laminate 70, after which the barrier laminate 70 is adhered over the joint 13. The laminating device 89 is somewhat similar to the laminating devices described in U.S. Pat. Nos. 4,379,019 (Pool) and 5,037,501 (Lawson) but is improved by the addition of a better cut off blade of the type described in U.S. Pat. No. 4,913,767 (Longworth), a guard for the cut off blade of the type described in U.S. Pat. No. 4,989,769 (Longworth et al), and a better tape guide system of the type described in U.S. Pat. No. 4,990,214 (Heil et al), the content of which U.S. Pat. Nos. 4,379,019, 5,037,501, 4,913,767, 4,989,769 and 4,990,214 are hereby incorporated herein by reference.

Figure 9:
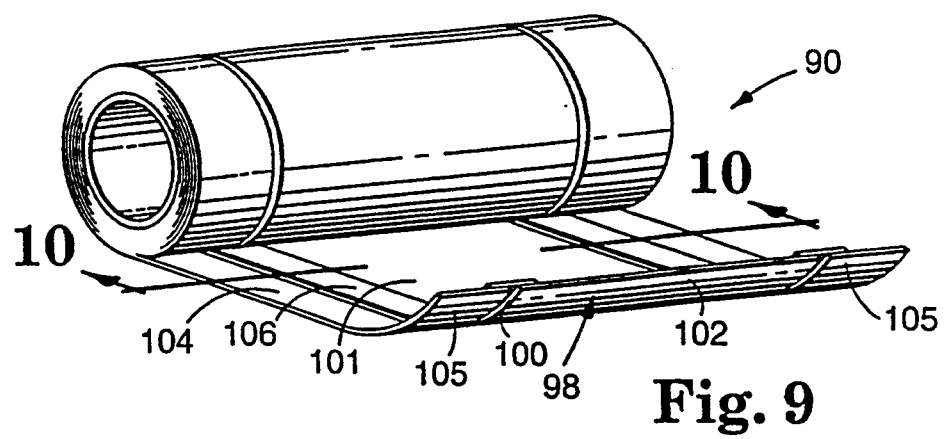
FIG. 9 is a perspective view of a fifth embodiment of a barrier laminate according to the present invention, illustrating a major portion of the barrier laminate disposed in a roll.
Figure 10:
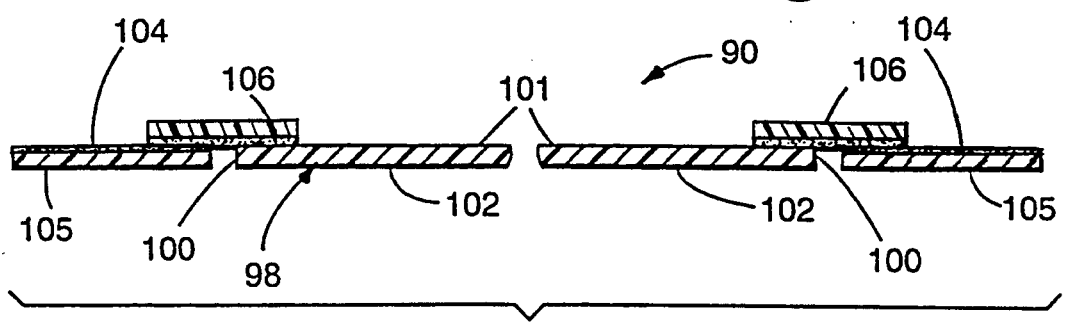
FIG. 10 is an enlarged sectional view taken approximately along line 10—10 of FIG. 9.

Referring now to FIGS. 9 and 10 of the drawing, there is shown a fifth embodiment of a barrier laminate according to the present invention generally designated by the reference numeral 90, which barrier laminate 90 is adapted for attachment to the outer surface of a structure, such as a house 12 illustrated in FIG. 11 after the sheathing 11 for the house 12 is attached and prior to attachment of siding to the house 12, to cover joints 13 between structural members assembled to form the structure or house 12.

As is seen in FIGS. 9 and 10, the barrier laminate 90 comprises a flexible elongate barrier layer 98 having opposite edges 100 and opposite first and second major surfaces 101 and 102. The barrier layer 98 is porous material (e.g., any one of the commercially available barrier sheet materials described above) so that the barrier layer 98 has minute passageways between its major surfaces 101 and 102 affording passage of water vapor between its major surfaces 101 and 102 while restricting the passage of liquid water and air between its major surfaces 101 and 102. The barrier laminate 90 also includes means providing an exposed layer 104 of pressure sensitive adhesive along each of the opposite edges 100 of the barrier layer 98 for adhering the barrier layer 98 to structural members on opposite sides of a joint 13 therebetween. In the barrier laminate 90, that means is provided by two first lengths 105 of tape each including a backing and a layer of pressure sensitive adhesive coated on one major surface of the backing (e.g., such as the pressure sensitive adhesive coated tape used is the tape sold under the trade name "8086 Contractors Sheathing Tape" by Minnesota Mining and Manufacturing Company, St. Paul, Minn. 75144-1000), which first lengths 105 of tape are adhered edge to edge with the barrier layer 98 by two second lengths of pressure sensitive adhesive coated tape 106 (e.g., also the 8086 Contractors Sheathing Tape). The Barrier laminate 90 could be prepared on factory equipment and rolled into a roll as shown. Alternatively, portions of the layers of pressure sensitive adhesive on each of the two lengths of tape 105 and 106 along each edge 100 of the barrier layer 98 can be adhered to each other using a laminating device of the type descried in U.S. Pat. No. 4,981,537 (the content whereof is incorporated herein by reference) after which the two laminates can either be adhered along the opposite edges 100 of the barrier layer 98 as shown, or the two laminates can first be adhered to a structure along opposite sides of the joint to be covered, and the barrier layer 98 can then be adhered to the exposed layers of adhesive on the second lengths 106 of tape in those laminates.

Figure 13:
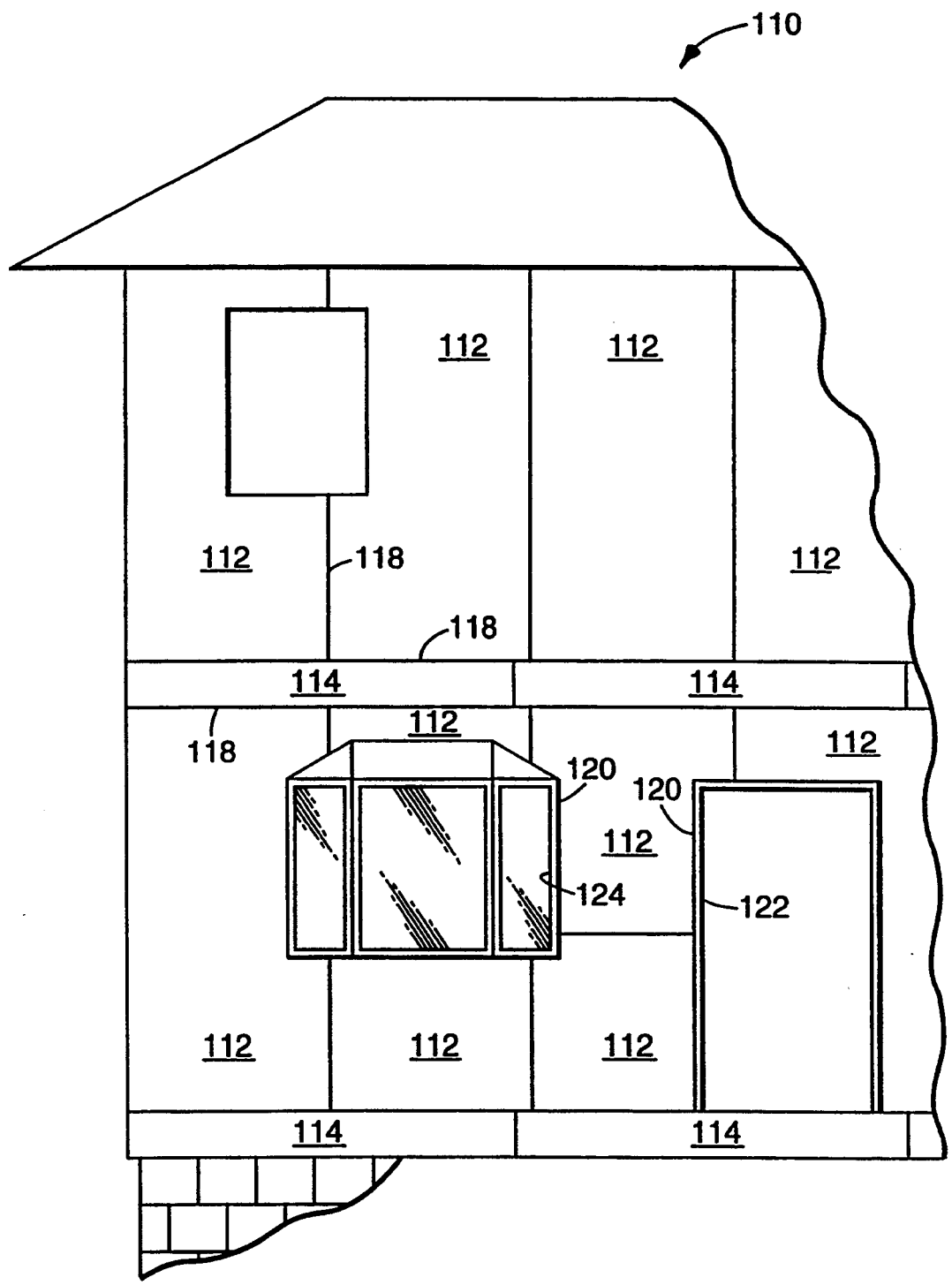
FIG. 13 is a fragmentary view of a structure after installation of sheathing but prior to application of a barrier laminate applied thereto.

Referring now to FIG. 13, a structure such as a two story house 110 preferably has sheathing members or panels 112 applied a cut down sheathing member 114 preferably covers a band joist 116 (see FIG. 14) between stories of house 110. It is to be understood that seams 118 between sheathing members 112, 114 and gaps or joints 120 with door frames 122 and window frames 124 may also be sealed by a barrier laminate according to the practice of the present invention.

Figure 14:
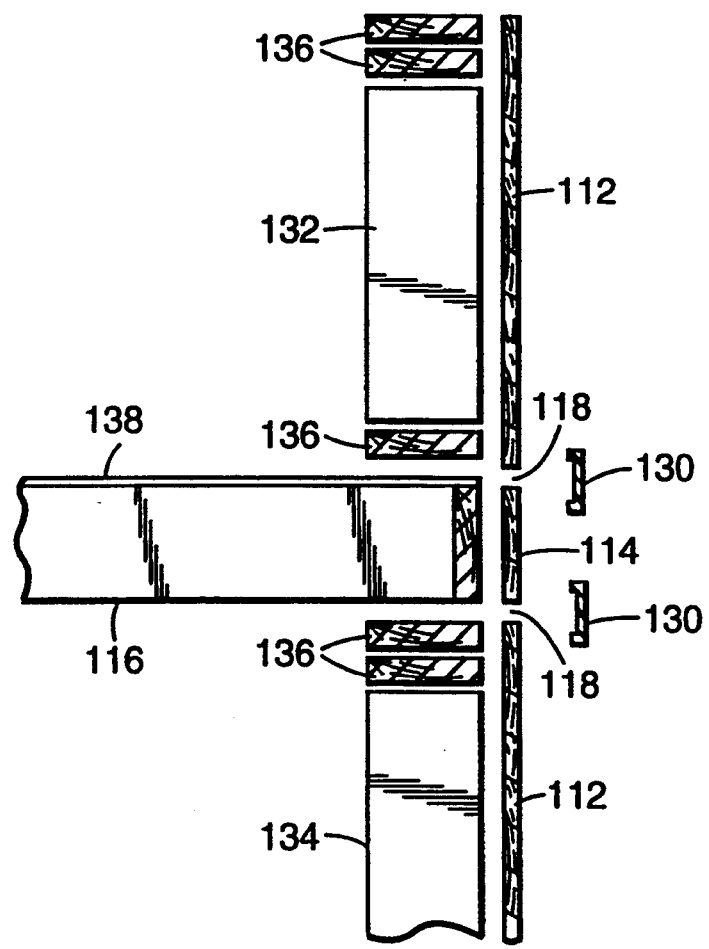
FIG. 14 is a detailed exploded view of a portion of the structure of FIG. 13 illustrating application of the barrier laminate to a band joist area of the structure.

More particularly, and referring now to FIG. 14, barrier laminate 130 in any of the embodiments of the present invention as preferably applied to seams 118 between sheathing members 112 and 114. It is to be understood that sheathing members 112 are applied to the exterior of the house frame which includes studs 132, 134 and plates 136. A subfloor 138 is preferably positioned on band joist 116 beneath adjacent plates 136.

Figure 15:
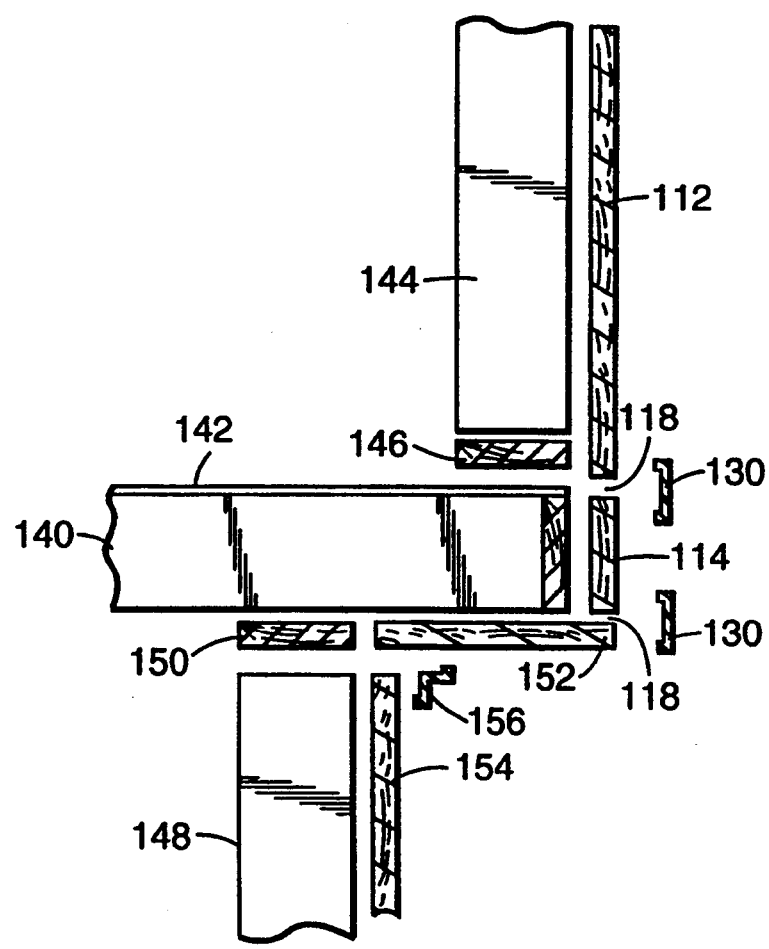
FIG. 15 is a detailed exploded view of a structure having a cantilevered wall illustrating application of the barrier laminate.

Referring now to FIG. 15, a cantilevered wall section may be seen having joist 140 carrying subfloor 142 and having an upper wall with studs 144 supported by plate 146 and a lower wall formed by studs 148 ending plate 150. In addition to sheathing members 112, 114, it is preferable to have a subjacent sheathing member 152 to close the gap that would otherwise occur between cut down sheathing member 114 and lower wall sheathing men%her 154. Barrier laminate 130 is preferably applied to the gaps or joints between sheathing members 112, 114 and sheathing members 114, 152. In addition, a barrier laminate 156 may be applied to the inside corner formed by subjacent sheathing member 152 and lower wall sheathing member 154 to seal the seam or gap therebetween.

Figure 16:
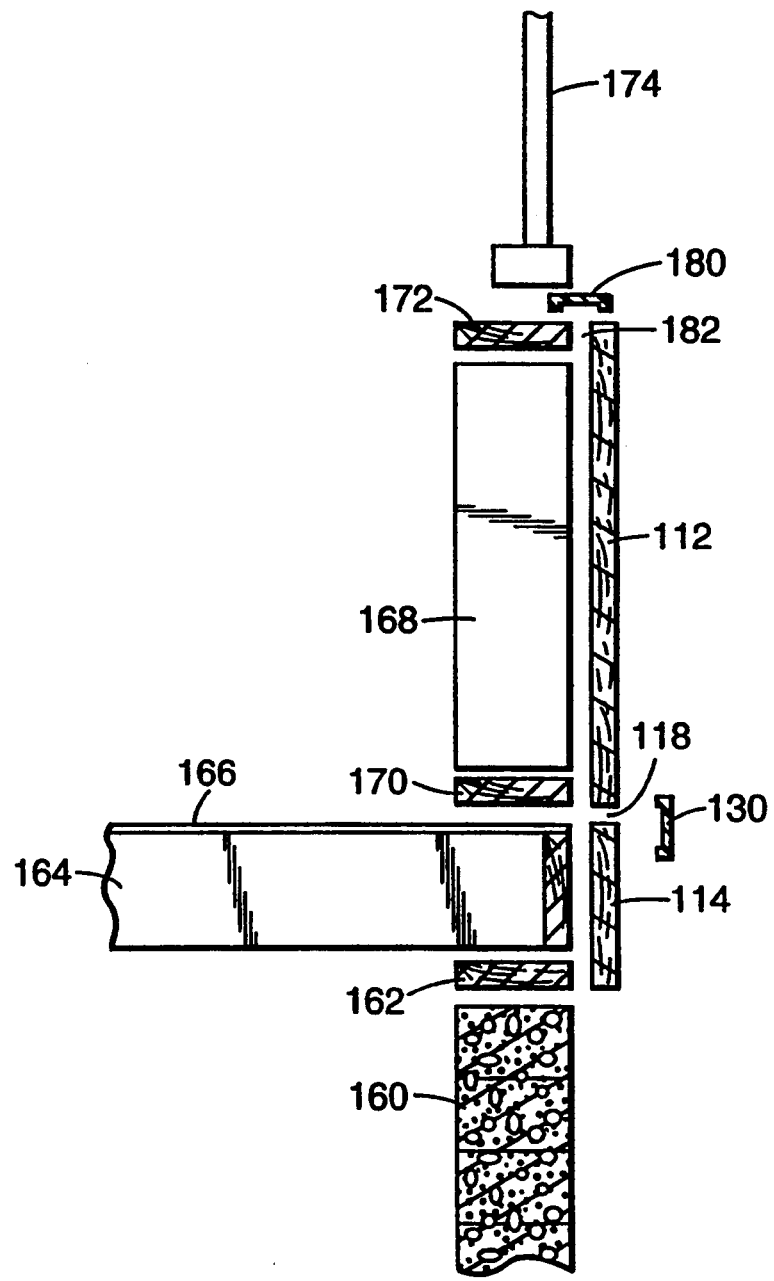
FIG. 16 is a detailed exploded view of a structure illustrating application of the barrier laminate to a standard wall framing detail.

Referring now to FIG. 16, foundation 160 preferably has a plate 162 located thereon supporting joist 164 and subfloor 166. An upper wall portion is formed by stud 168 carried by plate 170 and framing member 172. This upper wall section is sized to receive a window 174. Barrier laminate 130 is preferably used to seal the gap or seam 176 between sheathing members 112 and 114. A further barrier laminate 180 may be applied between sheathing member 112 and upper structural member 172 before window 174 is installed to seal gap 182 between member 172 and sheathing 112.

The present invention has now been described with reference to several embodiments thereof. It will be apparent to those skilled in the art that many changes can be made in the embodiments described without departing from the scope of the present invention. Thus the scope of the present invention should not be limited to the structures methods described in this application, but only by structures and methods described by the language of the claims and the equivalents of those structures and methods.

What is claimed is:

1. A barrier laminate for attachment to the outer surface of a structure, such as a house prior to attachment of its siding, to cover joints between structural members assembled to form the structure, said barrier laminate comprising:

a flexible elongate barrier layer having opposite edges and opposite first and second major surfaces said barrier layer having minute passageways between said major surfaces affording passage of water vapor between said major surfaces while restricting the passage of liquid water and air between said major surfaces; and an exposed layer of pressure sensitive adhesive coated along each of the opposite edges of the barrier layer for adhering the barrier layer to structural members on opposite sides of a joint therebetween such that exterior liquid water and air are each restricted from entering the structure while water vapor is permitted to pass through the barrier layer intermediate the opposite edges, thus permitting any moisture trapped interior of the barrier laminate to escape as water vapor.

2. A barrier laminate according to claim 1 wherein said exposed layer of pressure sensitive adhesive along each of the opposite edges of the barrier layer includes separate layers of pressure sensitive adhesive coated on elongate outer portions of said first major surface adjacent each of said opposite edges with said barrier layer having a central portion free of adhesive between said outer portions.

3. A barrier laminate according to claim 1 wherein said exposed layer of pressure sensitive adhesive along each of the opposite edges of the barrier layer includes spaced stripes of pressure sensitive adhesive coated on said first major surface, with two of said spaced stripes being on elongate outer portions of said first major surface adjacent each of said opposite edges, and with said barrier layer having portions free of adhesive between said stripes of adhesive.

4. A barrier laminate according to claim 1 wherein said exposed layer of pressure sensitive adhesive along each of the opposite edges of said barrier layer includes a layer of pressure sensitive adhesive coated entirely over said first major surface, said layer of adhesive having through openings aligned with the minute passageways between the major surfaces of said barrier layer to afford passage of water vapor through said barrier laminate.

5. A method for providing a barrier against the infiltration of air and moisture into a structure, such as a house prior to attachment of siding thereto, through joints between the structural members defining an outer surface of the structure, said method comprising:

providing a barrier laminate comprising a flexible elongate barrier layer having opposite edges, opposite first and second major surfaces, and minute passageways between said major surfaces affording passage of water vapor between said major surfaces while restricting the passage of liquid water and air between said major surfaces; and an exposed layer of pressure sensitive adhesive coated along each of said opposite edges; and adhering the exposed layer of pressure sensitive adhesive along each of the opposite edges of the barrier layer on the outer surface of structural members on opposite sides of a joint therebetween with the barrier layer extending longitudinally along and bridging widthwise across the joint such that exterior liquid water and air are each restricted from entering the structure while water vapor is permitted to pass through the barrier layer intermediate the opposite edges, thus permitting any moisture trapped interior of the barrier laminate to escape as water vapor.

6. The method according to claim 5 wherein the step of providing the barrier laminate further comprises providing the flexible elongate barrier layer with a central portion free of adhesive between the exposed layers of pressure sensitive adhesive along each of said opposite edges.

7. The method according to claim 6 wherein the step of adhering the exposed layers of pressure sensitive adhesive along each of the opposite sides of the joint in the outer surface of structural members further comprises positioning the central portion of the barrier layer longitudinally along and bridging widthwise across the joint.

8. The method according to claim 5 wherein the step of adhering the exposed layer of pressure sensitive adhesive further comprises bridging the joint in the outer surface of the structural members with a vapor-permeable, liquid impermeable central portion of the barrier laminate such that water vapor is permitted to pass through said major surfaces in said central portion.

* * * * *